Patented Apr. 26, 1932

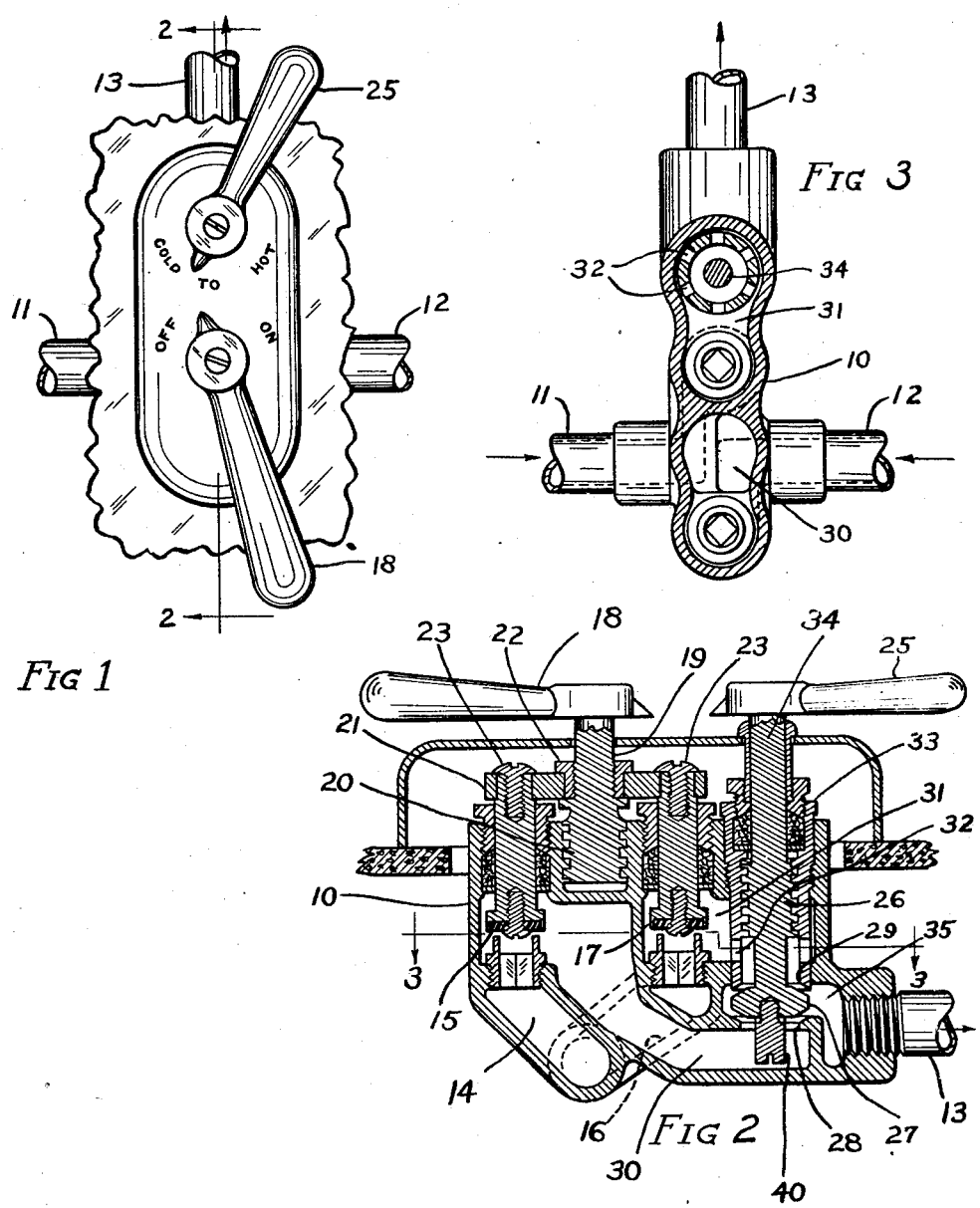

1,855,359

UNITED STATES PATENT OFFICE

WILLIAM V. McNAMARA, OF CLEVELAND, OHIO, ASSIGNOR TO THE VICTOR BRASS MANUFACTURING COMPANY, OF CLEVELAND, OHIO, A CORPORATION OF OHIO

MIXING VALVE

Application filed July 9, 1931. Serial No. 549,653.

This invention relates to valve structures and particularly to those which are adapted for use in connection with bath room fixtures. Where combined tub and shower fixtures are used, it has been difficult to provide an inexpensive valve, which would permit variations in the force of the shower without changing the temperature, and without using two independently operable valves, one for the hot and the other for cold supply respectively. The use of two such valves is objectionable, for it is difficult to obtain accurate variations in both and still maintain the same outlet temperature. On the other hand, where a single operating valve is used to control the temperature, no provision has been made for controlling the force except by a separate independent valve structure. Furthermore, the shut-off valve has been placed on the discharge side of the temperature control valve, so that the mixing chamber has been subjected to full-line pressure, even though the supply lines are closed. This arrangement then increases the difficulty of operating the temperature control valve handle, and makes it inconvenient to adjust the temperature, where the shower discharges into the bathtub and allows only a limited space for movement while the adjustment is being made.

An object of my invention, therefore, is to make provision for the volume control and temperature control in a single valve body structure, and to so arrange the parts that the volume control of the hot and cold supply is obtained by manipulating a single handle, while the temperature control is also obtained by the manipulation of a single operating handle. An additional feature is the provision for shutting off the main supply by the volume control operating member, whereby the mixing chamber cannot be subjected to surface pressure when the outlet line is closed. Thus, packing difficulties adjacent the operating handles are minimized, and the handles may thereby be rendered easy to operate.

Referring now to the drawings, Fig. 1 is a front elevation of a fixture embodying my invention; Fig. 2 is a section on an enlarged scale taken on the line 2—2 in Fig. 1, and Fig. 3 is a section taken on the line 3—3 in Fig. 2.

My invention, in the preferred form, comprises a single valve body structure 10, which has provision for communication to a hot water conduit 11 and a cold water conduit 12 respectively, and to an outlet conduit 13, which may lead either to a tub or shower outlet. The cold water line is in communication with a passageway 14 which is adapted to be controlled by a valve 15, while the hot water line is in communication with a passageway 16, which is adapted to be controlled by a valve 17. These two valves are then arranged to be simultaneously operated by manipulation of a single handle 18. To this end, the handle is affixed to a stem 19, which in turn is connected by a quick-turn connection 20 to the valve body. The stem is also connected to the valve members 15 and 17 by a yoke 21, which is removably attached to the stem 19 by a sleeve 22, and to the stems of the members 15 and 17 by securing members 23. With this arrangement the volume of cold and hot water flowing through the valve may be controlled by the operation of a single member.

The temperature of the water flowing through the valve is also adapted to be controlled by a single operating handle 25, which in turn is arranged by a quick-turn connection 26 with the valve body to control the position of a valve member 27 with respect to valve seats 28 and 29, respectively. The valve seat 28 is in communication with the cold water valve through the passageway 30, while the valve seat 29 is in communication with the hot water valve through passageway 31 and openings 32 in the sleeve 33. Such sleeve provides the reactionary member for the stem 34 of the valve member 27.

The chamber 35 in which the valve member 27 operates is thus a mixing chamber, which communicates directly with the outlet conduit 13. Hence, temperature of the water in such chamber is controlled independently of the force or volume flowing through the outlet conduit, so that for a given force at the shower head, the temperature may be independently and quickly controlled. By having the non-stop mixer on the discharge side of the supply valves, it is not necessary to provide packing washers between the member 27 and its associated seats 28 and 29, respectively. Instead, it is only necessary to pack the stem against leakage axially as is shown in Fig. 2. This applies also to the packing utilized for the stems of the valve members 15 and 17 respectively.

To avoid scalding, I have shown a member 40 which is adjustably threaded into the end of the stem 34 on the cold water side of the mixing chamber. This member may be turned sufficiently far outwardly that the outer end thereof engages the passageway 30 before the valve 27 seats tightly against the valve 28. This will insure the passage of cold water into the mixing chamber and thereby provide an anti-scalding feature for the device.

Utilization of the combined volume and temperature control valves in a single structure provides an economical device, which has valuable advantages from an installation viewpoint. From an operating viewpoint, the provision of independent single-controlled handles enables one to regulate the volume and temperature independently of each other in the most expeditious manner. Furthermore, my placing the volume control member on the discharge side of the supply members, the packing difficulties are minimized, and the handles are made easy to operate. Furthermore, by means of such arrangement, the supply from both the hot and cold water lines is automatically shut off, when the supply to the outlet 12 is shut off. Thus it is not necessary to utilize check valves in either the hot or cold lines to avoid siphoning from the bath fixtures to the lavatory fixtures, as is the case where the shut off valve is between the temperature regulating valve and the outlet.

I claim:

1. A device of the character described, comprising in combination, a valve body having hot and cold water inlets, a valve for controlling the volume of water flowing through each inlet, a single operating member for simultaneously operating said valves, and a mixing valve operable independently of said members and valves and mounted within the body on the discharge side of said valves.

2. In a device of the character described, the combination with a valve body having hot and cold water inlets, a shut-off valve for each inlet, a member having a quick-turn threaded connection with the valve body, means for connecting the member to said valves whereby the valves may be simultaneously and equally operated, a mixing chamber on the discharge side of said valves, said chamber being in communication with the outlet, and a valve within the chamber for proportioning the volume of hot and cold water flowing into the outlet, and an operating handle for the last named valve.

3. In a device of the character described, the combination with a valve body having hot and cold water inlets and having a mixing chamber therein, valves for controlling the flow of water through the inlets, a single operating member disposed outside the body, and means connecting the member to the valves for operating the valves simultaneously and in substantially equal amounts to control the amount of water flowing through the body, and other means operable in the mixing chamber and independently of said member for mixing the hot and cold water and thereby to control the temperature of the water flowing through the body, said last named means being controlled by a member outside the body.

4. In combination, a valve body having hot and cold water inlets, a shut-off valve for each inlet, a single operating member having a quick turn threaded connection with the body, means for connecting the member to each of the valves, whereby the valves are operated simultaneously and only in equal degrees, a mixing chamber within the body, a passageway leading from each valve to the chamber and a single member operating in said chamber for controlling the flow from said passageways into the chamber, said last named member being operable independently of the first named member and valves, whereby the temperature may be controlled independently of the volume of water flowing through the shut-off valves.

5. In a device of the character described, the combination with a valve body having hot and cold water inlets, a mixing chamber and an outlet, a shut off valve for each inlet, two independently operable control members carried by the body, means for connecting one of the members to the shut off valves for operating them in substantially equal degrees at all times, and a valve connected to the other member and disposed in the mixing chamber for proportioning the mixture of hot and cold water, regardless of the extent to which the shut off valves are opened, whereby the temperature and volume of water flowing through the outlet may each be controlled by the operation of a single member.

6. A device of the character described, comprising in combination, a valve body having hot and cold inlets and an outlet, shut-off valves for controlling the inlets, a single member for simultaneously and equally operating said valves, a mixing chamber in communication with each of said valves, said mixing chamber having opposed valve seats, a valve member operable reciprocably within the chamber and adapted to coact with said seats to proportion the volume of hot and cold water flowing into the chamber, a single operating member for said valve member, and a stop for adjustably limiting the movement of the valve member toward the cold water seat.

In testimony whereof, I hereunto affix my signature.

WILLIAM V. McNAMARA.